United States Patent
Suzuki

(10) Patent No.: US 10,566,153 B2
(45) Date of Patent: Feb. 18, 2020

(54) LEVER DEVICE

(71) Applicant: Valeo Japan Co., Ltd., Saitama (JP)

(72) Inventor: Mitsuhiro Suzuki, Tokyo (JP)

(73) Assignee: Valeo Japan Co., Ltd. (JP)

( * ) Notice: Subject to any disclaimer, the term of this patent is extended or adjusted under 35 U.S.C. 154(b) by 86 days.

(21) Appl. No.: 15/808,883

(22) Filed: Nov. 9, 2017

(65) Prior Publication Data

US 2018/0174780 A1 Jun. 21, 2018

(51) Int. Cl.
*H01H 21/22* (2006.01)
*H01H 21/04* (2006.01)

(52) U.S. Cl.
CPC ............ *H01H 21/22* (2013.01); *H01H 21/04* (2013.01)

(58) Field of Classification Search
CPC ........ H01H 21/22; H01H 21/04; H01H 25/04; H01H 13/02; B60Q 1/1469; B60Q 1/1476
USPC .......................................................... 200/335
See application file for complete search history.

(56) References Cited

U.S. PATENT DOCUMENTS

| 2003/0010616 A1* | 1/2003 | Kato | B60Q 1/1469 |
|---|---|---|---|
| | | | 200/335 |
| 2008/0211609 A1* | 9/2008 | Ichimura | B60Q 1/1469 |
| | | | 335/205 |

FOREIGN PATENT DOCUMENTS

JP 2000-322982 A 11/2000

OTHER PUBLICATIONS

Eng. Abstract for JP-2000-322982.

* cited by examiner

*Primary Examiner* — Edwin A. Leon
*Assistant Examiner* — Iman Malakooti
(74) *Attorney, Agent, or Firm* — Fishman Stewart PLLC

(57) ABSTRACT

A lever device may include a movable component including a pair of support arm portions. The lever device may also include an operable knob provided with a base end portion inserted between the pair of support arm portions, the base end portion being supported by the pair of support arm portions to be rotatable around a first axis line. The lever device may further include a fixed component configured to assemble a polar board and a cover in a direction of a second axis line perpendicular to the first axis line, the movable component being supported to be rotatable around the second axis line in the fixed component. Arc-shaped guide grooves to surround the second axis line by a predetermined interval as viewed in the direction of the second axis line may be provided respectively on opposing faces of each other of the polar board and the cover. Projections engaging to the guide groove in a polar board side and the guide groove in a cover side may be provided in the support arm portion.

12 Claims, 11 Drawing Sheets

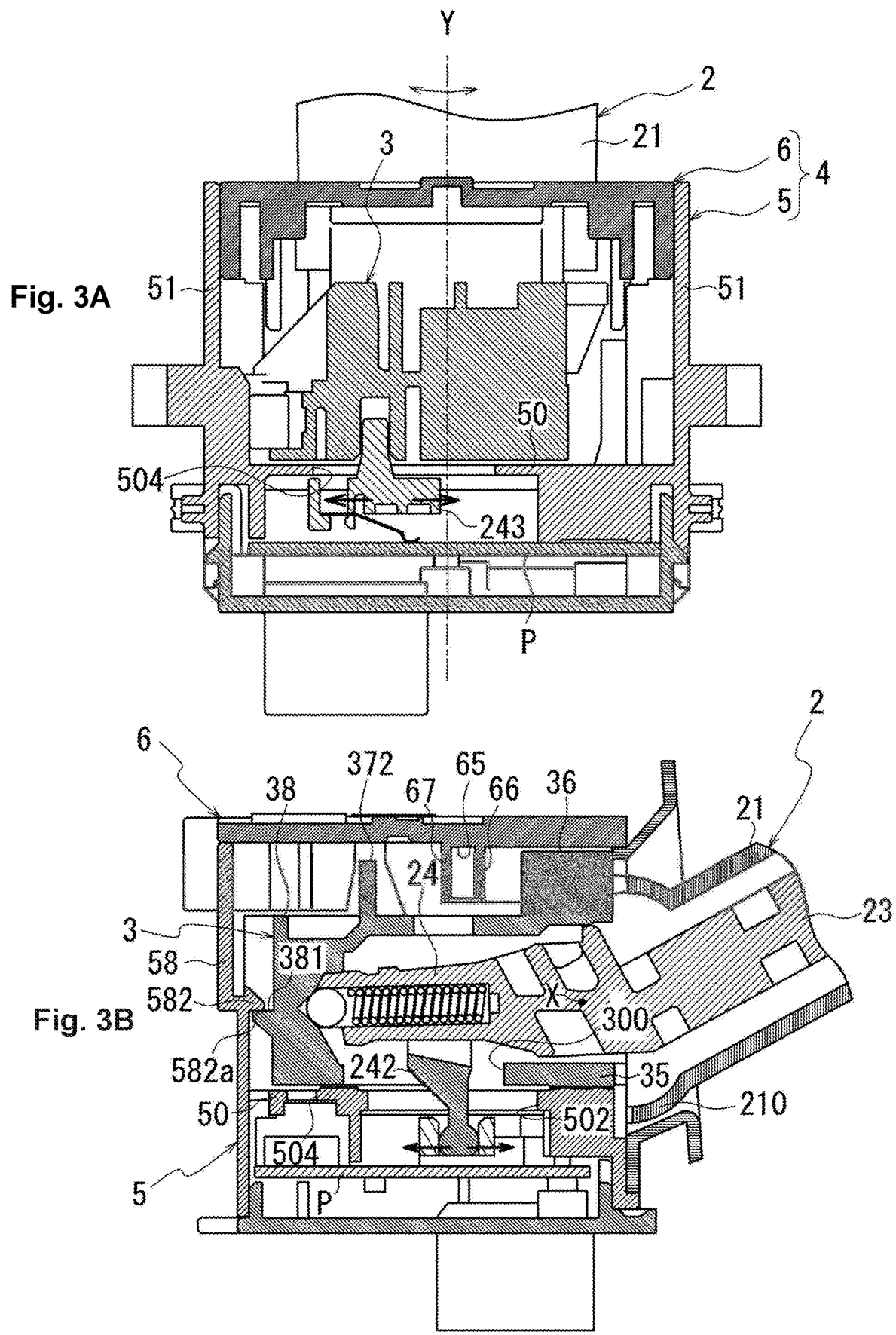

LEVER DEVICE

CROSS-REFERENCE TO RELATED APPLICATION

This application claims priority under 35 USC 119 from Japanese Patent Application No. 218415/2016 filed on Nov. 8, 2016, the disclosure of which is incorporated by reference herein.

BACKGROUND OF THE INVENTION

Field of the Invention

The present invention relates to a lever device for a vehicle.

Description of the Related Art

Japanese Patent Laid-Open No. 2000-322982 A discloses a lever device to which two functions are assigned.

FIG. 12A and FIG. 12B are drawings explaining a lever device according to a conventional example, wherein FIG. 12A is an exploded perspective view and FIG. 12B is a cross sectional view by cutting away a movable component 104 on plane A in FIG. 12A.

As illustrated in FIG. 12A and FIG. 12B, there is an example of this type of lever devices 100, in which an operable knob 101 is rotated around an axis line X upon turning on/turning off a turn signal and is rotated around an axis line Y perpendicular to the axis line X upon flashing.

Therefore the operable knob 101 is configured such that a base end portion 103 thereof inserted in the movable component 104 is supported to be rotatable around the axis line X by the movable component 104, and the movable component 104 is supported to be rotatable around the axis line Y within a fixed component 110 formed by covering an upper opening of a polar board 111 with a cover 112.

The movable component 104 is provided with shaft-shaped projections 105 arranged upward and downward in a direction of the axis line Y for rotating the movable component 104 around the axis line Y. The polar board 111 and the cover 112 in the fixed component 110 are provided with cylindrical support portions 113 each having a thickness in a direction of the axis line Y to rotatably support the shaft-shaped projections 105 of the movable component 104. The polar board 111 and the cover 112 are thicker in the direction of the axis line Y by a magnitude corresponding to the necessity for the support portion 113.

As illustrated in FIG. 12B, the movable component 104 has a pair of support arm portions 106 to support the operable knob 101 to be rotatable around the axis line X.

The support arm portions 106 are provided with support holes 106a penetrating in the direction of the axis line X, and support shafts 103a projecting from both sides of the base end portion 103 in the direction of the axis line X are rotatably supported in the support holes 106a.

SUMMARY OF THE INVENTION

Here, when the operable knob 101 is forcibly operated in a direction of rotating the movable component 104 around the axis line Y, the support arm portions 106 supporting the support shafts 103a in the operable knob 101-side are subjected to stress in a direction of causing the support arm portions 106 to be away from each other in the direction of the axis line X.

In addition, in a case where the movement of the support arm portions 106 in the direction of the axis line X is not restricted, the operable knob 101 possibly drops from the movable component 104.

Therefore in the lever device 100 according to the conventional example, a protection portion 102 for protecting a connecting portion between the operable knob 101 and the movable component 104 is provided with restriction portions 102a for restricting displacements of the support arm portions 106 in the direction of the axis line X.

However, for positioning the restriction portions 102a on both the sides of the support arm portions 106, it is necessary to ensure a clearance for inserting the restriction portions 102a between the fixed component 110 and the movable component 104, and the thickness in the direction of the axis line X also increases by a magnitude corresponding to ensuring the clearance therebetween.

Therefore it is demanded to further miniaturize the lever device.

The present invention has an object of providing a lever device that can accomplish further miniaturization thereof.

A lever device according to the present invention comprises:

a movable component including a pair of support arm portions;

an operable knob provided with a base end portion inserted between the pair of support arm portions, the base end portion being supported by the pair of support arm portions to be rotatable around a first axis line; and a fixed component configured to assemble a polar board and a cover in a direction of a second axis line perpendicular to the first axis line, the movable component being supported to be rotatable around the second axis line in the fixed component, wherein arc-shaped guide grooves to surround the second axis line by a predetermined interval as viewed in the direction of the second axis line are provided on opposing faces of each other of the polar board and the cover, and projections engaging to the guide groove in the polar board side and the guide groove in the cover side are provided in the support arm portion.

According to the present invention, the lever device can be further miniaturized.

BRIEF DESCRIPTION OF THE DRAWINGS

FIG. 3A is a cross sectional view explaining the lever device.

FIG. 3B is a cross sectional view explaining the lever device.

DESCRIPTION OF THE PREFERRED EMBODIMENTS

Hereinafter, an explanation will be made of a lever device according to an embodiment of the present invention.

Figure 1:
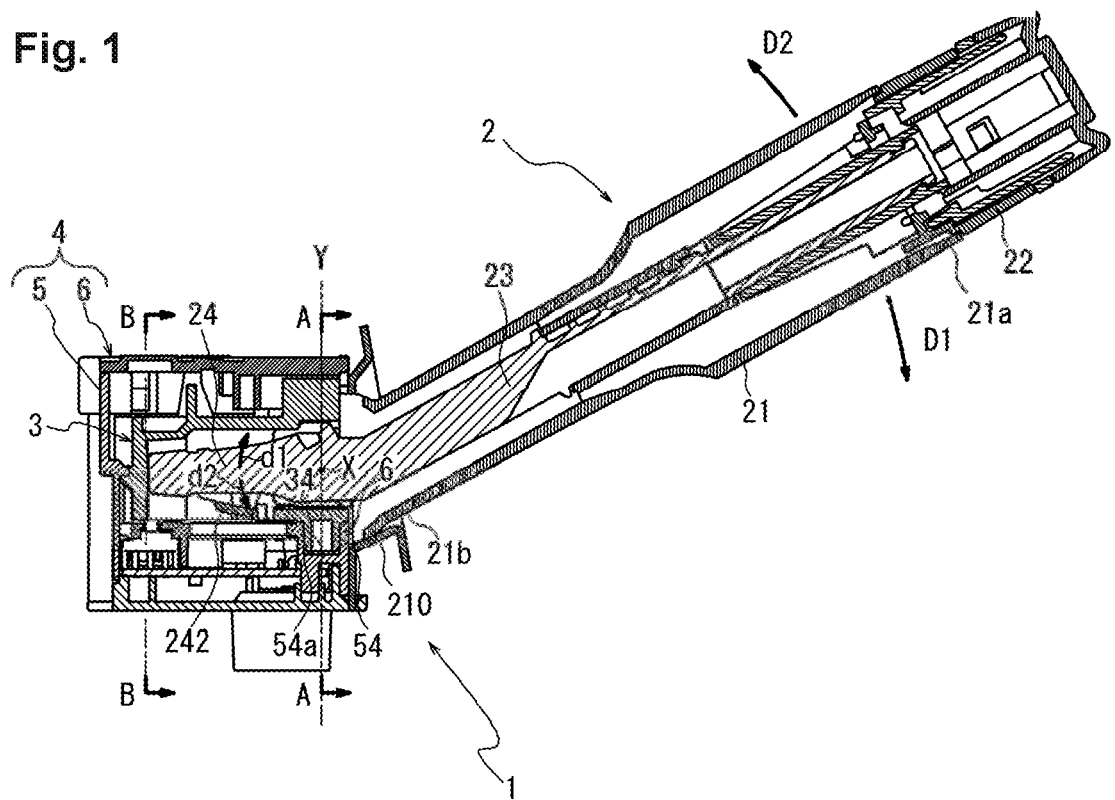
FIG. 1 is a cross sectional view explaining a lever device.

FIG. 1 is a drawing explaining a lever device 1, and is a cross sectional view by cutting away the lever device 1 along an operable knob 2.

Figure 2:
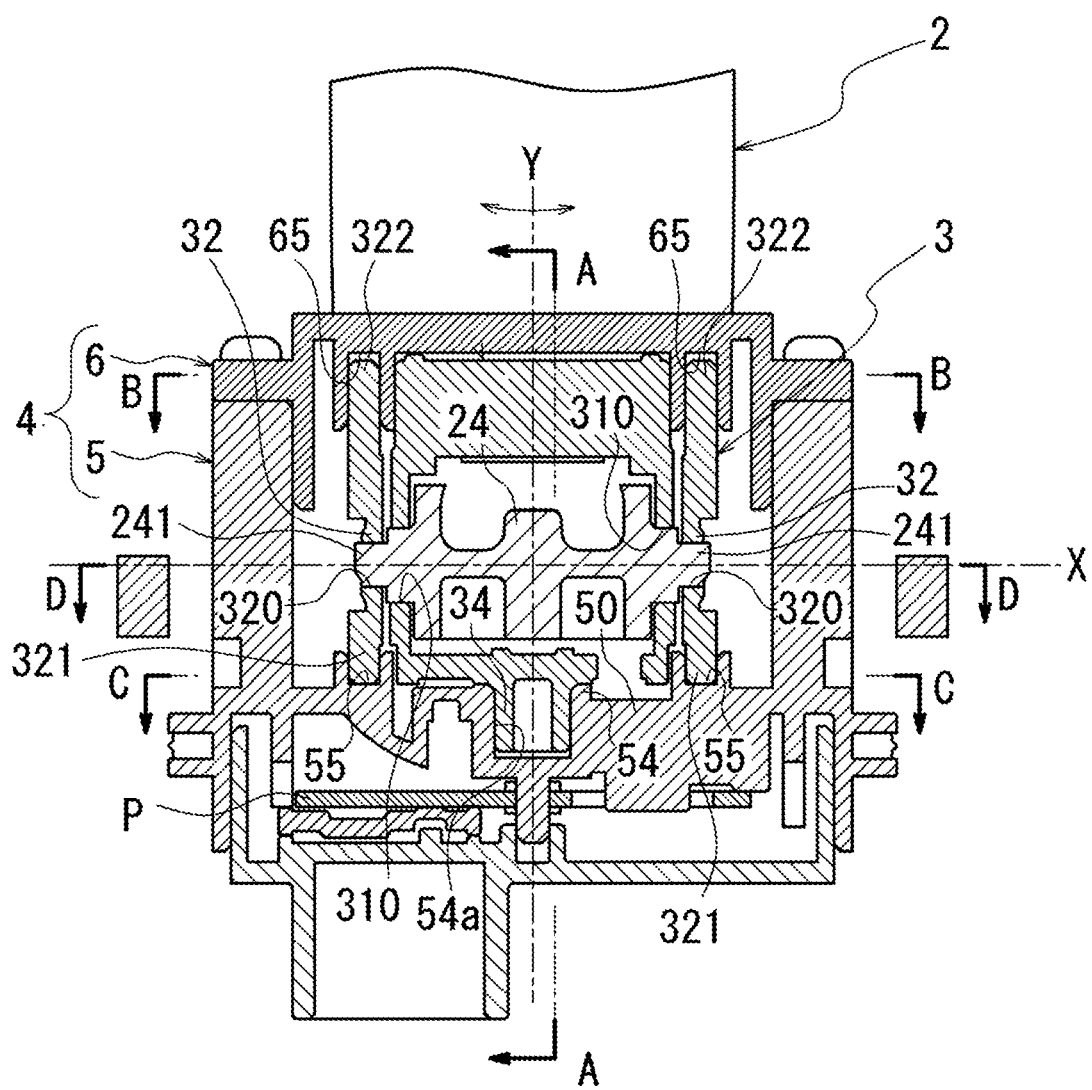
FIG. 2 is a cross sectional view explaining the lever device.

FIG. 2 is a drawing explaining the lever device 1, and is a cross sectional view by cutting away the lever device 1 along line A-A in FIG. 1.

FIG. 3A and FIG. 3B are drawings explaining the lever device 1, wherein FIG. 3A is a cross sectional view by cutting away the lever device 1 along line B-B in FIG. 1, and FIG. 3B is a cross sectional view by cutting away the lever device 1 along line A-A in FIG. 2.

As illustrated in FIG. 1, the lever device 1 has the operable knob 2 that is operated by a user, and the operable knob 2 is provided with a rotational knob 22 in one end 21a-side of a cylindrical cover portion 21 in a longitudinal direction.

The operable knob 2 has a shaft member 23 connected integrally with the cover portion 21 in the inside of the cover portion 21.

An operating portion 24 (base end portion) in the base end side of the shaft member 23 projects from a protection portion 210 provided in the other end 21b of the cover portion 21 and is inserted in a movable component 3.

As illustrated in FIG. 2, the movable component 3 has a pair of support arm portions 32, and the operating portion 24 inserted between the pair of support arm portions 32 is supported on the pair of support arm portions 32 to be rotatable around an axis line X (first axis line).

Therefore as illustrated in FIG. 1, when the operable knob 2 is operated in a D1 direction in the figure, the operating portion 24 displaces in a d1 direction in the figure in a circumferential direction around the axis line X, and when the operable knob 2 is operated in a D2 direction in the figure, the operating portion 24 displaces in a d2 direction in the figure in the circumferential direction around the axis line X.

An operating element 242 (refer to FIG. 3B) of a switch is connected to the operating portion 24. When the operating portion 24 displaces around the axis line X by a rotational operation of the operable knob 2 around the axis line X, the operating element 242 (refer to FIG. 3B) displaces in a direction determined in accordance with the displacement direction of the operating portion 24 to turn on a switch (unillustrated) positioned in a side of the moving direction.

Further, as illustrated in FIG. 3A, the operable knob 2 is operated to be rotated around an axis line Y as well perpendicular to the axis line X, and for enabling the rotation of the operable knob 2 around the axis line Y, the movable component 3 supporting the operable knob 2 is supported by a fixed component 4 accommodating the movable component 3 to be rotatable around the axis line Y (second axis line).

When the movable component 3 rotates around the axis line Y, an operating element 243 (refer to FIG. 3A) fixed to the movable component 3 displaces in a direction determined in accordance with the displacement direction of the movable component 3 to turn on a slide switch (unillustrated).

As illustrated in FIG. 2, the fixed component 4 accommodating the movable component 3 is formed by assembling a polar board 5 and a cover 6 accommodating a print board P in a direction of the axis line Y.

[Cover 6]

Figure 4A:
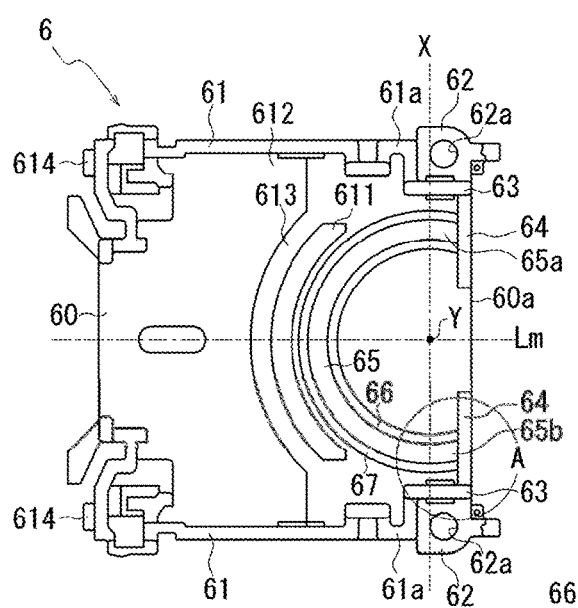
FIG. 4A is a plan view explaining a cover.
Figure 4B:
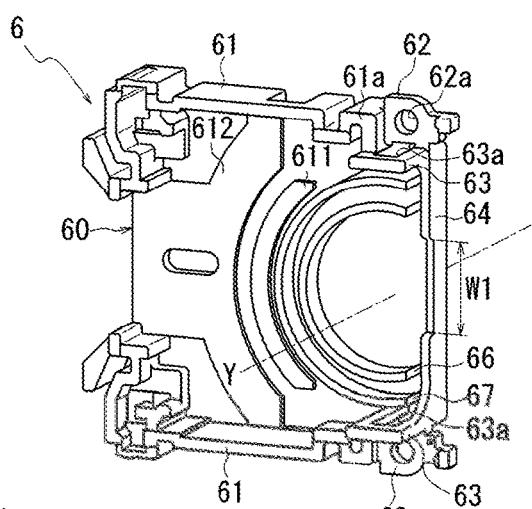
FIG. 4B is a perspective view explaining the cover.
Figure 4C:
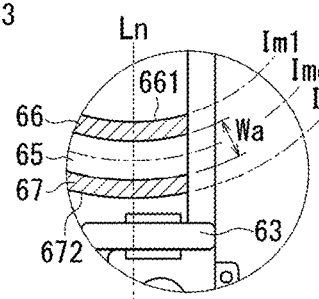
FIG. 4C is a partially enlarged view in FIG. 4A.

FIGS. 4A to 4C are drawings explaining the cover 6, wherein FIG. 4A is a plan view illustrating the cover 6 as viewed from the polar board 5-side, FIG. 4B is a perspective view illustrating the cover 6 as viewed from the polar board 5-side, and FIG. 4C is an enlarged view of a region A in FIG. 4A.

It should be noted that in FIG. 4C, guide walls 66, 67 positioned in both sides of a guide groove 65 are illustrated by hatching for clarifying a position of the guide groove 65.

In a plan view, the cover 6 is provided with a ceiling plate portion 60 formed in a substantially rectangular shape, and side walls 61 are provided on both sides of the ceiling plate portion 60 in a width direction to extend to the polar board 5-side.

The side walls 61 are provided with mounting portions 62 having screw holes 62a neighbored to end portions 61a of the side walls 61 on one end, and the screw hole 62a is provided to penetrate through the mounting portion 62 in a thickness direction (direction of the axis line Y) of the ceiling plate portion 60.

The mounting portions 62 are provided to be symmetric about a virtual line Lm (third axis line) passing the center of the ceiling plate portion 60 in the width direction (upper-lower direction in FIG. 4A).

It should be noted that the virtual line Lm passes a crossing point between the axis line X and the axis line Y and is perpendicular to the axis line X and the axis line Y.

Engaging elements 63 are provided in the mounting portions 62 in the virtual line Lm-side to extend to the polar board 5-side, and the engaging elements 63 extend closer to the polar board 5-side than the side walls 61.

As viewed from the polar board 5-side, the engaging elements 63 are provided in parallel with each other in positions symmetric about the virtual line Lm, and engaging holes 63a, to which engaging projections 521a (refer to FIG. 5A) are engaged, in the polar board 5-side are formed in the engaging elements 63.

As viewed from the polar board 5-side, ribs 64 are provided on the engaging elements 63 in the virtual line Lm-side. The ribs 64 extend in a direction of being closer to each other along a side edge 60a of the ceiling plate portion 60.

The ribs 64 are provided to be symmetric about the virtual line Lm and are opposed to each other with an interval W1 therebetween in a direction perpendicular to the virtual line Lm (direction of the axis line X).

The guide groove 65 formed in an arc shape as viewed from the polar board 5-side is formed between a pair of guide walls 66, 67 in the inside of the ribs 64.

In the present embodiment, as illustrated in FIG. 4C, as viewed from the polar board 5-side, the guide walls 66, 67 respectively have an inner periphery 661 and an outer periphery 672 positioned on virtual circles Im1, Im2 surrounding the axis line Y of the operable knob 2 by a predetermined interval, and a space between the guide walls 66, 67 forms part of the guide groove 65.

The guide groove 65 is formed in an arc shape along a virtual circle Imc surrounding the axis line Y by a predetermined interval, and is formed with the same width Wa across an entire length thereof in a circumferential direction around the axis line Y.

As illustrated in FIG. 4A, one end 65*a*-side and the other end 65*b*-side of the guide groove 65 in the circumferential direction around the axis line Y cross the axis line X from one side to the other side in the direction of the virtual line Lm, and the one end 65*a* and the other end 65*b* are positioned in the other side of the axis line X in the direction of the virtual line Lm.

A reinforcement rib 611 formed by expanding the ceiling plate portion 60 to the polar board 5-side is provided in an outer diameter side of the guide wall 67 on a basis of the axis line Y. As viewed from the polar board 5-side, the reinforcement rib 611 is formed in an arc shape along an outer periphery of the guide wall 67.

Further, a recessed groove 613 along an outer periphery of the reinforcement rib 611 is formed in an outer diameter side of the reinforcement rib 611 on a basis of the axis line Y, and an outer diameter side of the recessed groove 613 forms a sliding region 612 formed by expanding the ceiling plate portion 60 to the polar board 5-side.

The sliding region 612 is formed as a flat plane perpendicular to the axis line Y, and at the time the movable component 3 rotates around the axis line Y as described later, upper ends 371*a* of abutting walls 371 (refer to FIGS. 8A and 8B) provided in the movable component 3 slide on the sliding region 612.

The sliding region 612 is provided to prevent the movable component 3 from rotating around the axis line Y in a state of being inclined to the axis line Y.

[Polar Board 5]

Figure 5A:
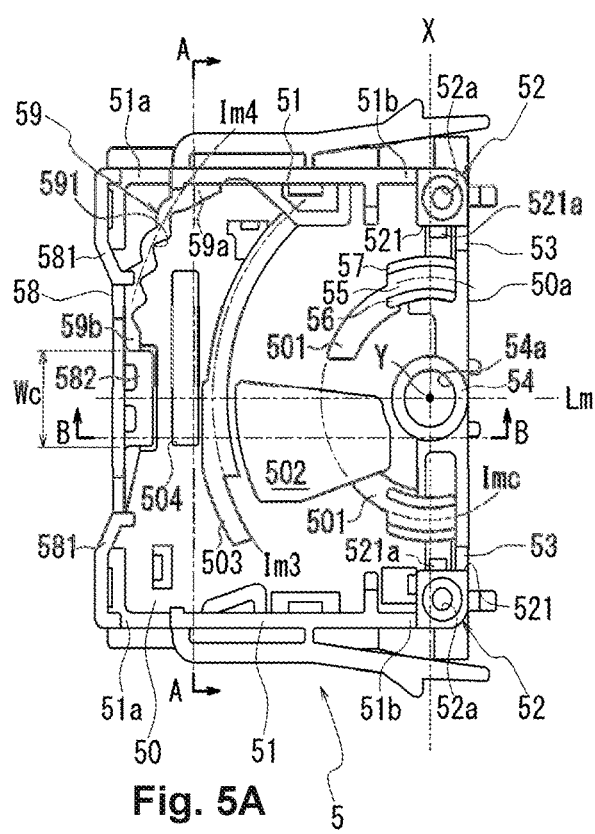
FIG. 5A is a plan view explaining a polar board.
Figure 5B:
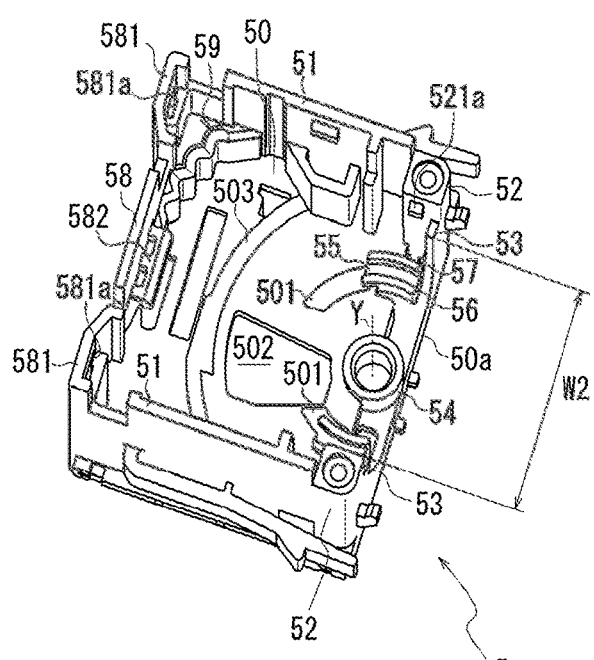
FIG. 5B is a perspective view explaining the polar board.

FIGS. 5A and 5B are drawings explaining the polar board 5, wherein FIG. 5A is a plan view illustrating the polar board 5 as viewed from the cover 6-side and FIG. 5B is a perspective view illustrating the polar board 5 as viewed from the cover 6-side.

Figure 6:
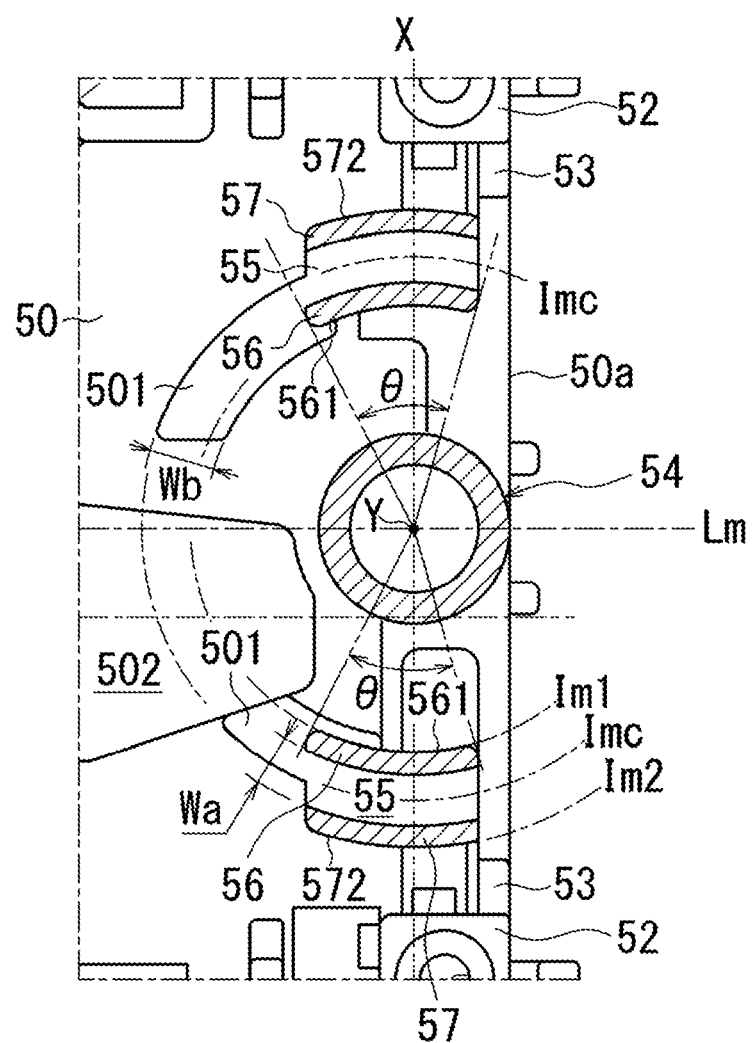
FIG. 6 is an enlarged view illustrating an essential part of the polar board.

FIG. 6 is an enlarged view illustrating an essential part around a guide groove 55 and a support tube 54 in the polar board 5.

It should be noted that in FIG. 6, guide walls 56, 57 positioned in both sides of the guide groove 55 and the support tube 54 are illustrated by hatching for clarifying positions of the guide groove 55 and the support tube 54.

As illustrated in FIGS. 5A and 5B, in a plan view as viewed from the cover 6-side, the polar board 5 has a partition wall portion 50 substantially in parallel to the above-mentioned ceiling plate portion 60, and side walls 51 are provided in both sides of the partition wall portion 50 in a width direction (upper-lower direction in FIG. 5A) to extend to the cover 6-side.

End portions 51*a* on one side of the side walls 51 are connected by a depth wall 58 extending to the cover 6-side, and in the partition wall portion 50, the movable component 3 is accommodated in an inside region surrounded by the side walls 51 and the depth wall 58.

As illustrated in FIG. 3A, the partition wall portion 50 is provided in the halfway position of the side walls 51 in a height direction (direction of the axis line Y). In the direction of the axis line Y, the movable component 3 is accommodated in the polar board 5 at the cover 6-side of the partition wall portion 50 and the print board P is accommodated therein at the opposite side of the partition wall portion 50.

As illustrated in FIG. 5A, the side walls 51 are provided with boss portions 52 neighbored to the other end portion 51*b*, the boss portions having screw holes 52*a*.

As viewed from the cover 6-side, the boss portions 52 are provided in positions symmetric about the virtual line Lm passing the center of the partition wall portion 50 in a width direction, and side faces 521 of the boss portions 52 in the virtual line Lm-side are formed as flat planes along the virtual line Lm.

The side faces 521 are provided with the engaging projections 521*a* extending to the virtual line Lm side, and upon assembling the cover 6 to the polar board 5, the engaging projections 521*a* are engaged into the engaging holes 63*a* (refer to FIG. 4B) provided in the engaging elements 63 of the cover 6.

As viewed from the cover 6-side, ribs 53 extending to the virtual line Lm-side are provided on the boss portions 52 in the virtual line Lm-side along a side edge 50*a* of the partition wall portion 50.

The ribs 53 are provided to be symmetric about the virtual line Lm and are opposed to each other with an interval W2 therebetween in a direction perpendicular to the virtual line Lm (direction of the axis line X).

As viewed from the cover 6-side, the cylindrical support tube 54 is provided in a position intersecting with the virtual line Lm between the boss portions 52 in the partition wall portion 50.

The support tube 54 is provided to be concentric with the axis line Y as a rotational shaft of the operable knob 2, and a shaft portion 34 (refer to FIGS. 7A and 7B) of the movable component 3 as described later is inserted in a support hole 54*a* of the support tube 54.

As illustrated in FIG. 6, guide grooves 55 formed in an arc shape as viewed from the cover 6-side are formed between the pair of guide walls 56, 57 in the axis line Y-side (left side in the figure) of the ribs 53.

In the present embodiment, the guide walls 56, 57, as viewed from the cover 6-side, have respectively an inner periphery 561 and an outer periphery 572 positioned on virtual circles Im1, Im2 surrounding the axis line Y as the rotational shaft of the operable knob 2 by a predetermined interval, and a space between the guide walls 56, 57 forms part of the guide grooves 55.

The guide groove 55 is formed in an arc shape along a virtual circle Imc surrounding the axis line Y by a predetermined interval, and each of the guide grooves 55 is formed with the same width Wa in the circumferential direction around the axis line Y.

The guide grooves 55 between the guide walls 56, 57 are provided in positions symmetric about the virtual line Lm, and each of them is provided in the same angle range θ in the circumferential direction around the axis line Y.

The guide grooves 55 are provided to cross the axis line X that is perpendicular to the virtual line Lm and passes the axis line Y. The guide grooves 55 each have a length of a direction along the virtual circle Imc that is longer in a region positioned in an insert hole 502-side of the partition wall portion 50 (left side in the figure) than in a region positioned in the opposite side (right side in the figure), on a basis of the axis line X.

Further, the partition wall portion 50 is provided with reinforcement ribs 501 on extension of the guide wall 56, and the reinforcement ribs 501 are formed by recessing the partition wall portion 50 to the cover 6-side.

The reinforcement ribs 501 are formed in an arc shape along the virtual circle Im1, and each have a radial width Wb from the virtual circle Imc to an inner diameter side of the virtual circle Im1 on a basis of the axis line Y.

The insert hole 502 is opened between the one reinforcement rib 501 and the other reinforcement rib 501 for insert of the operating element 242 (refer to FIG. 2B).

In addition, as illustrated in FIG. 5A, a reinforcement rib 503 along a virtual circle Im3 on a basis of the axis line Y is provided in an outer diameter side of the insert hole 502 on a basis of the axis line Y. This reinforcement rib 503 as well is formed by recessing the partition wall portion 50 to the cover 6-side, and is formed in an arc shape as viewed from the cover 6-side.

Further, a rectangular through hole 504 is formed in an outer diameter side of the reinforcement rib 503 on a basis of the axis line Y.

The through hole 504 is provided to be directed along the above-mentioned axis line X, and is provided for insert of an operating element 243 (refer to FIG. 3A).

In addition, a click wall 59 having click grooves 591 on a face thereof in the through hole 504-side is provided in an outer diameter side of the through hole 504 on a basis of the axis line Y. The click groove 591 is provided along a virtual circle Im4 on a basis of the axis line Y, and includes click grooves connected in a direction along the virtual circle Im4.

One end 59a of the click wall 59 is connected to an inner periphery of the side wall 51, and the other end 59b is connected to an inner periphery of a depth wall 58.

An engaging projection 582 projecting to the axis line Y-side is provided on the inner periphery of the depth wall 58.

The engaging projection 582 is provided in a range of bridging over the virtual line Lm, and is formed with a predetermined width We in a direction of the axis line X.

As illustrated in FIG. 3B, an abutting face 582a of the engaging projection 582 in the partition wall portion 50-side is formed as a flat face perpendicular to the axis line Y, and when the movable component 3 rotates around the axis line Y, a sliding face 381 of the movable component 3 as described later slides on the abutting face 582a of the engaging projection 582.

As illustrated in FIGS. 5A and 5B, engaging elements 581 to the cover 6 are provided in both side parts of the depth wall 58 as viewed from the cover 6-side, and the engaging elements 581 are provided with engaging holes 581a to which engaging projections 614 (refer to FIG. 4A) in the cover 6-side are engaged.

[Movable Component 3]

Figure 7A:
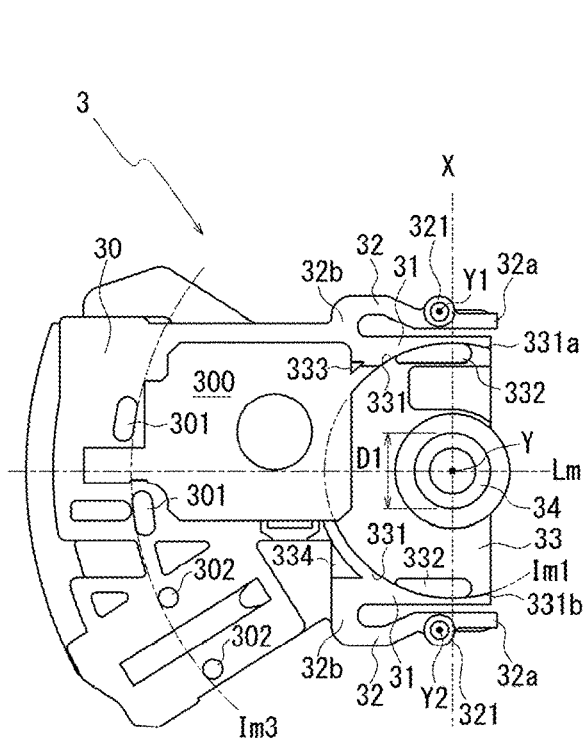
FIG. 7A is a plan view explaining a movable component.
Figure 7B:
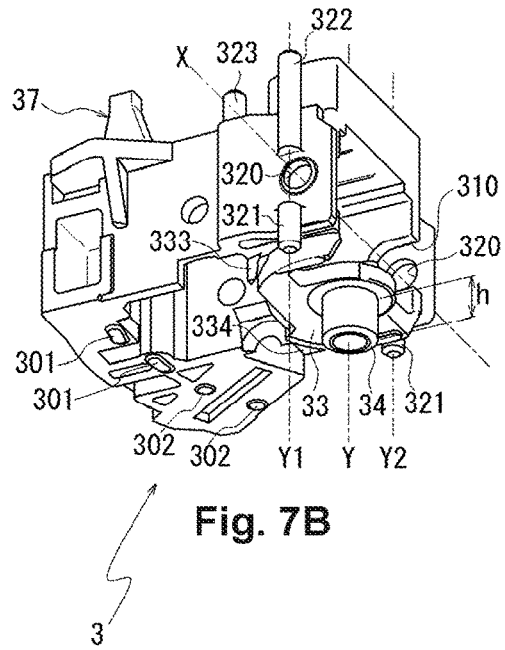
FIG. 7B is a perspective view explaining the movable component.

FIG. 7A and FIG. 7B are drawings explaining the movable component 3, wherein FIG. 7A is a plan view as viewed from the polar board 5-side, and FIG. 7B is a perspective view as viewed from the polar board 5-side.

Figure 8A:
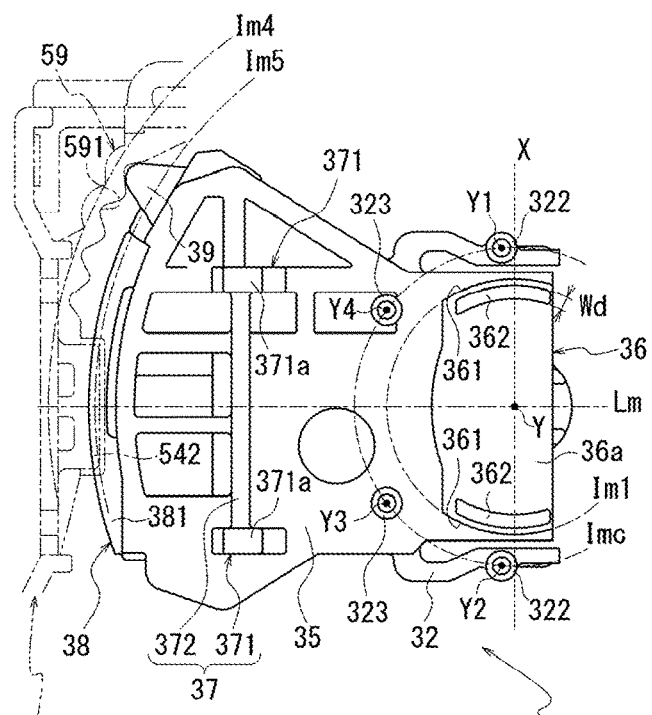
FIG. 8A is a plan view explaining the movable member.
Figure 8B:
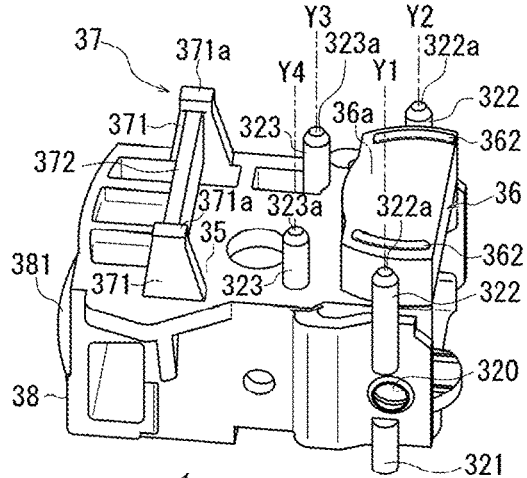
FIG. 8B is a perspective view explaining the movable member.

FIG. 8A and FIG. 8B are drawings explaining a movable member, wherein FIG. 8A is a plan view as viewed from the cover 6-side, and FIG. 8B is a perspective view as viewed from the cover 6-side.

As illustrated in FIGS. 7A and 7B, in the movable component 3, side walls 31 are provided on both sides about the virtual line Lm perpendicular to the axis line Y, and a support plate 33 having the cylindrical shaft portion 34 is provided to bridge over the side walls 31.

In the support plate 33, the shaft portion 34 is provided to be concentric with the axis line Y in a position where the virtual line Lm and the axis line Y intersect.

The shaft portion 34 projects from the support plate 33 to the polar board 5-side, and as viewed in the direction of the axis line Y, the shaft portion 34 is formed with an outer diameter D1 matching the support hole 54a (refer to FIG. 5A) of the support tube 54 of the polar board 5 as described before.

An arc-shaped sliding face 331 formed by cutting out an outer periphery of the support 33 is formed in a region of the support plate 33 overlapping the side walls 31 as viewed in the direction of the axis line Y.

The sliding face 331 is provided along the virtual circle Im1 along the inner periphery 561 (refer to FIG. 6) of the guide wall 56 as described before except for a region overlapping an insert hole 300 of the operating element 242 (refer to FIG. 3B).

The sliding face 331 is provided to bridge over the axis line X perpendicular to the axis line Y and the virtual line Lm from one side to the other side of the axis line X, and one end 331a and the other end 331b of the sliding face 331 in the circumferential direction are positioned to be closer to the operable knob 2-side (right side in the figure) than the axis line X.

Sliding elements 332 are provided on an opposing face of the support plate 33 to the polar board 5 in positions intersecting with the axis line X, and the sliding elements 332 are provided to be symmetric about the shaft portion 34.

The sliding elements 332 are provided along the sliding face 331, and are formed in a tapered shape in which a radial thickness on the axis line Y is thinner as being away from the axis line X to the insert hole 300-side (left side in FIG. 7A).

The sliding elements 332 are provided to abut on the reinforcement ribs 501 (refer to FIG. 6) provided in the partition wall portion 50 of the polar board 5 upon assembling the movable component 3 between the polar board 5 and the cover 6, and when the movable component 3 rotates around the axis line Y, the sliding elements 332 slide on part of the reinforcement ribs 501 of the partition wall portion 50.

A bottom wall portion 30 of the movable component 3 is provided with stoppers 333, 334 spaced by a predetermined interval from the sliding face 331. When the movable component 3 rotates largely around the axis line Y by an operation of the operable knob 2, the stoppers 333, 334 collide with the guide wall 56 to block the rotation of the movable component 3 (operable knob 2).

The insert hole 300 for insert of the operating element 242 (refer to FIG. 3B) is formed on the bottom wall portion 30 of the movable component 3 in a radial outside of the support plate 33 on a basis of the axis line Y.

A plurality of sliding elements 301, 302 projecting to the polar board 5-side are provided in the outer diameter side of the insert hole 300, and the plurality of sliding elements 301, 302 are provided to be spaced from each other along a virtual circle Im3 on a basis of the axis line Y.

The sliding elements 301, 302 are provided to abut on the reinforcement rib 503 (refer to FIGS. 5A and 5B) provided in the partition wall portion 50 of the polar board 5 upon assembling the movable component 3 between the polar board 5 and the cover 6, and when the movable component 3 rotates around the axis line Y, the sliding elements 301, 302 slide on part of the reinforcement rib 503 of the partition wall portion 50.

As illustrated in FIG. 7A, the side walls 31 positioned in both sides of the bottom wall portion 30 in the width direction are provided with the support arm portions 32 extending outward of the side walls 31.

The support arm portions 32 extend outward from a boundary portion between the insert hole 300 and the support plate 33 in the side walls 31, and then, extend along the side walls 31. Tip ends 32a of the support arm portions 32 reach positions over the axis line X to the operable knob 2-side (right side in the figure) as described before.

In the support arm portions 32, columnar guide shafts 321 are provided on outer peripheries of the support arm portions 32 in positions closer to base ends 32b thereof than the axis line X.

The support arm portions 32 are supported on a cantilever basis by the side walls 31, and the tip ends 32a-side provided with the guide shafts 321 are resiliently movable in the width direction of the bottom wall portion 30 (upper-lower direction in FIG. 7A).

As illustrated in FIGS. 7A and 7B and in FIG. 2, support holes 320 penetrating through the support arm portions 32 in the thickness direction are provided in a substantially central part in the direction of the axis line Y in the support arm portions 32.

When an engaging shaft 241 (refer to FIG. 2) extending from the operating portion 24-side of the operable knob 2 is engaged to the support holes 320, the operable knob 2 is rotatably supported around the axis line X in the movable component 3.

Therefore notches 310 for avoiding interference with the engaging shaft 241 are provided in a region of the side walls 31 positioned in the inside of the support arm portions 32 (refer to FIG. 7B).

As illustrated in FIG. 7B, the support arm portions 32 are provided with guide shafts 322 in the opposite side of the guide shafts 321 about the support holes 320. The guide shafts 322 and the guide shafts 321 are coaxially arranged on the axis lines Y1, Y2 in parallel to the axis line Y.

As illustrated in FIGS. 8A and 8B, as viewed from the cover 6-side, an upper wall portion 35 of the movable component 3 is provided with a guide portion 36 in a region between the guide shaft 322 and the guide shaft 322.

The guide portion 36 projects to the cover 6-side from the upper wall portion 35, and is provided in a range of bridging over the virtual line Lm and the axis line X.

An opposing face of the guide portion 36 to the cover 6 is a flat face perpendicular to the axis line Y, and arc-shaped sliding faces 361 formed by cutting out an outer periphery of the guide portion 36 are formed in a region of the guide portion 36 opposing the guide shafts 322 as viewed in the direction of the axis line Y.

The sliding faces 361 are provided along a virtual circle Im1 along an inner periphery 661 (refer to FIG. 4C) of the guide wall 66 as described before, and is provided to bridge over the axis line X from one side to the other side of the axis line X.

An opposing face 36a of the guide portion 36 to the cover 6 is provided with sliding elements 362 in positions intersecting with the axis line X.

The sliding elements 362 project from the opposing face 36a to the cover 6-side, and are provided along the sliding faces 361 in an inner diameter side (axis line Y-side) of the sliding faces 361.

The sliding elements 362 are formed in an arc shape as viewed in the direction of the axis line Y, and each are formed with a substantially same width Wd in the circumferential direction around the axis line Y.

The sliding elements 362 abut on the ceiling plate portion 60 of the cover 6 upon assembling the movable component 3 between the polar board 5 and the cover 6.

In the present embodiment, the sliding elements 362 abut on a region of the ceiling plate portion 60 in the inside of the guide wall 66 (axis line Y-side, refer to FIG. 4A), and when the movable component 3 rotates around the axis line Y, the sliding elements 362 slide on the ceiling plate portion 60 in the axis line Y-side of the guide wall 66.

As illustrated in FIGS. 8A and 8B, the guide shafts 322 positioned in both sides of the guide portion 36 are positioned on the virtual circle Imc at the center of the axis line Y in the direction of the axis line X, and two guide shafts 323 are further positioned on the virtual circle Imc.

As viewed in the direction of the axis line Y, the guide shafts 323 are provided in positions symmetric about the virtual line Lm, and are provided to project from the upper wall portion 35 to the cover 6-side.

Upper ends 323a of the guide shafts 323 and upper ends 322a of the guide shafts 322 are respectively arranged in the same height position (refer to FIG. 8B).

As illustrated in FIG. 8A, a posture holding portion 37 is provided in an outer diameter side of the guide shafts 323 on a basis of the axis line Y.

The posture holding portion 37 has abutting walls 371 arranged in parallel with each other about the virtual line Lm and a reinforcement wall 372 provided in a direction perpendicular to the virtual line Lm, and is provided to project from the upper wall portion 35 to the cover 6-side.

The reinforcement wall 372 connects opposing faces of the abutting walls 371 with each other, and the posture holding portion 37 is formed in an H shape as viewed from the cover 6-side.

Upper ends 371a of the abutting walls 371 are formed as flat faces perpendicular to the axis line Y, and abut on the sliding region 612 (refer to FIG. 4) of the cover 6 upon assembling the cover 6 to the polar board 5.

A sliding portion 38 formed in an arc shape as viewed in the direction of the axis line Y is positioned in an outer diameter side of the posture holding portion 37 on a basis of the axis line Y. An upper face of the sliding portion 38 in the cover 6-side is formed as an arc-shaped sliding face 381 along a virtual circle Im5 at the center of the axis line Y, and the sliding face 381 is formed as a flat face perpendicular to the axis line Y.

As viewed in the direction of the axis line Y, the sliding face 381 is provided in a position of overlapping the engaging projection 582 of the depth wall 58 in the polar board 5 upon assembling the cover 6 to the polar board 5, and when the movable component 3 is accommodated between the polar board 5 and the cover 6, the sliding face 381 abuts on the abutting face 582a of the engaging projection 582 in the direction of the axis line Y (refer to FIG. 3B).

In the sliding portion 38 of the movable component 3, an engaging projection 39 is further provided in a region opposing the click wall 59 of the polar board 5. The engaging projects 39 freely projects/retreats from the outer periphery of the sliding portion 38, and when the movable component 3 is accommodated between the polar board 5 and the cover 6, the engaging projection 39 is resiliently engaged to the click grooves 591 of the click wall 59.

Hereinafter, an explanation will be made of an operation of the lever device 1 as configured above by taking a case of operating the operable knob 2 in a direction indicated by an arrow in FIG. 9A as an example.

Figure 9A:
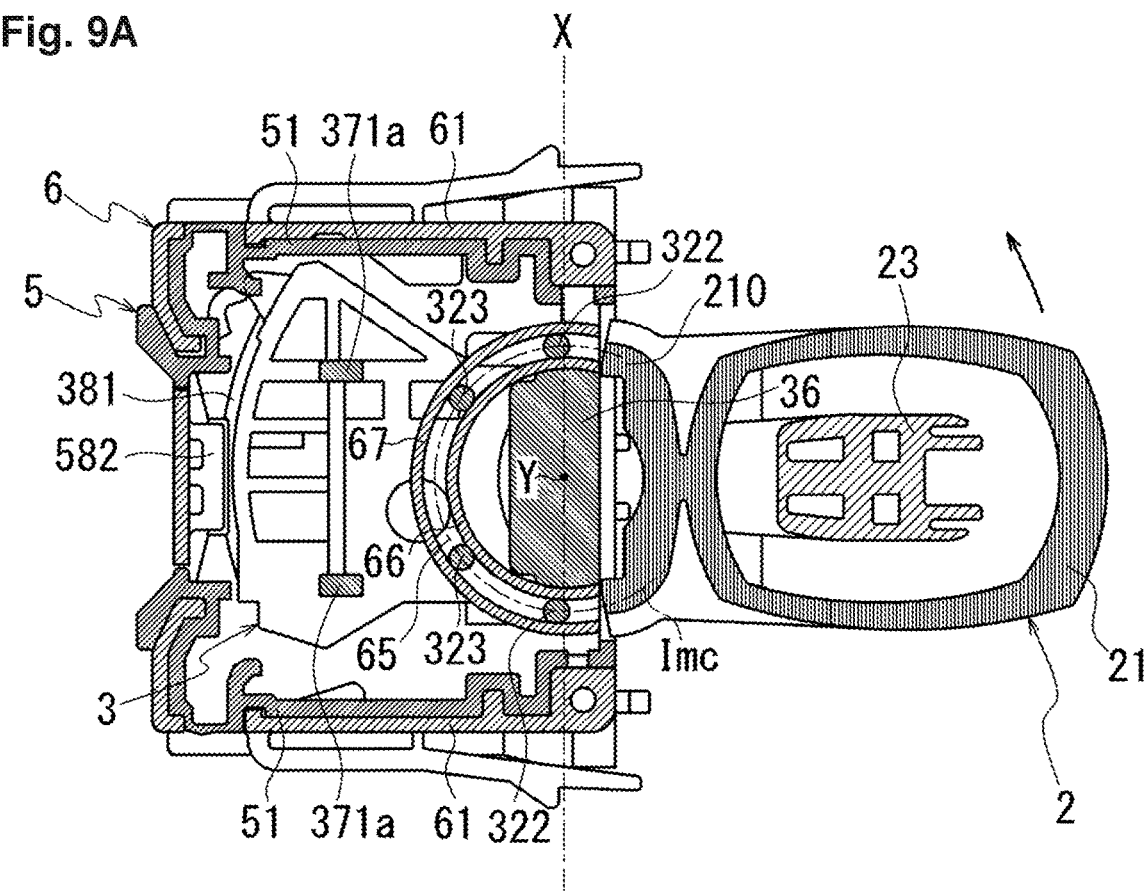
FIG. 9A is a cross sectional view explaining an operation of the lever device.
Figure 9B:
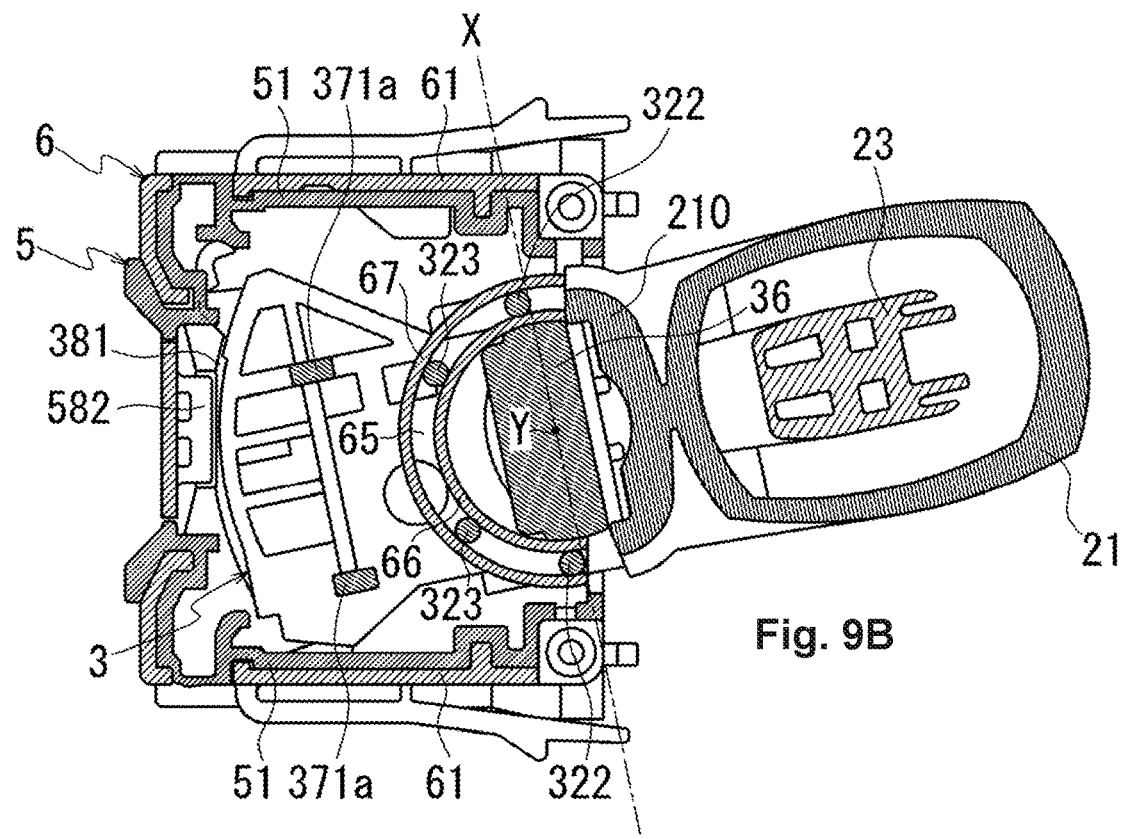
FIG. 9B is a cross sectional view explaining the operation of the lever device.

FIGS. 9A and 9B are drawings explaining a displacement of the movable component 3 upon operating the operable knob 2 in the lever device 1 and are cross sectional views taken along line B-B in FIG. 2.

Figure 10A:
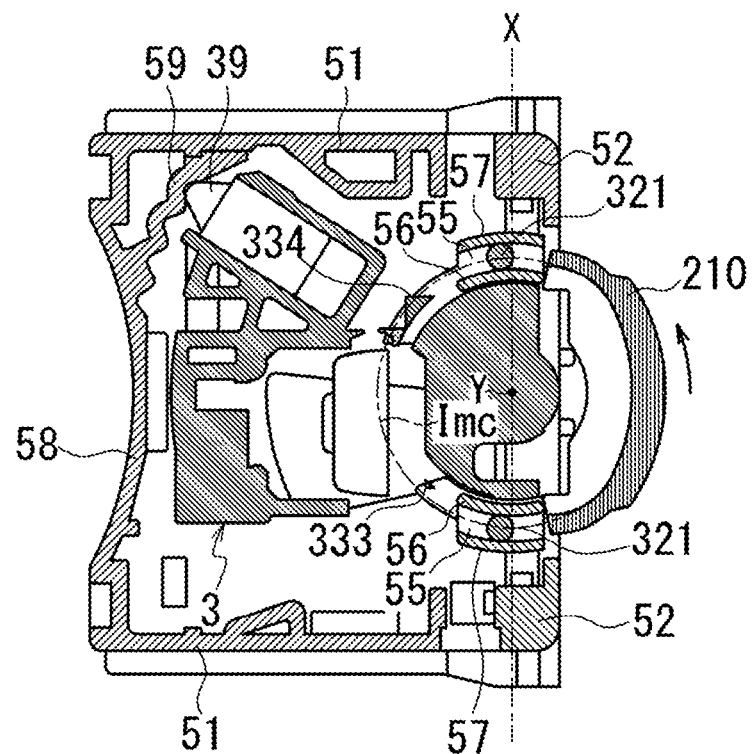
FIG. 10A is a cross sectional view explaining the operation of the lever device.
Figure 10B:
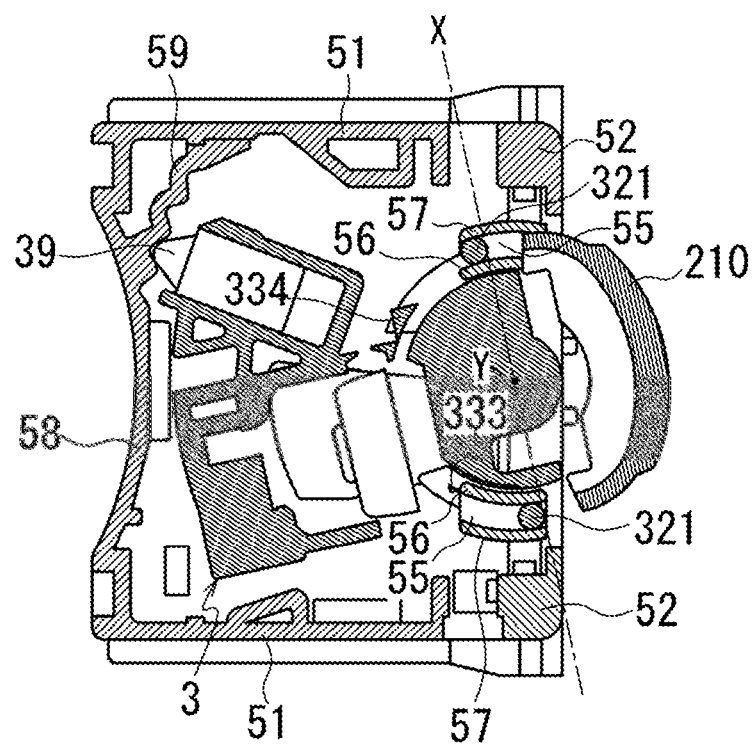
FIG. 10B is a cross sectional view explaining the operation of the lever device.

FIGS. 10A and 10B are drawings explaining a displacement of the movable component 3 upon operating the operable knob 2 in the lever device 1 and are cross sectional views taken along line C-C in FIG. 2.

Figure 11A:
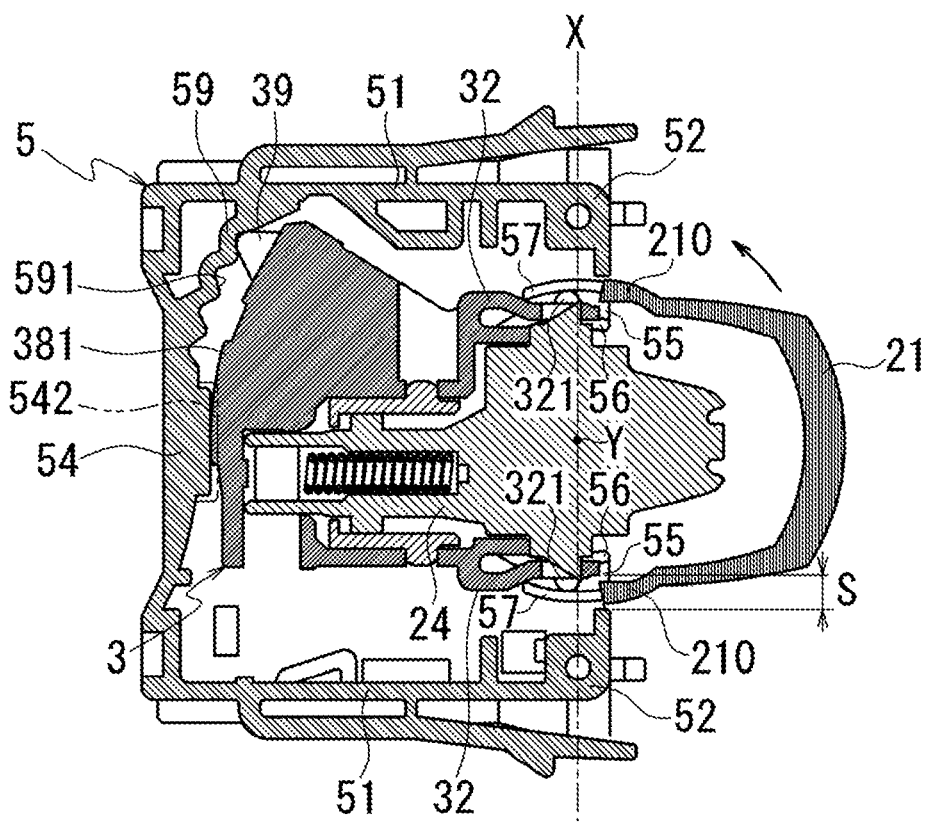
FIG. 11A is a cross sectional view explaining the operation of the lever device.
Figure 11B:
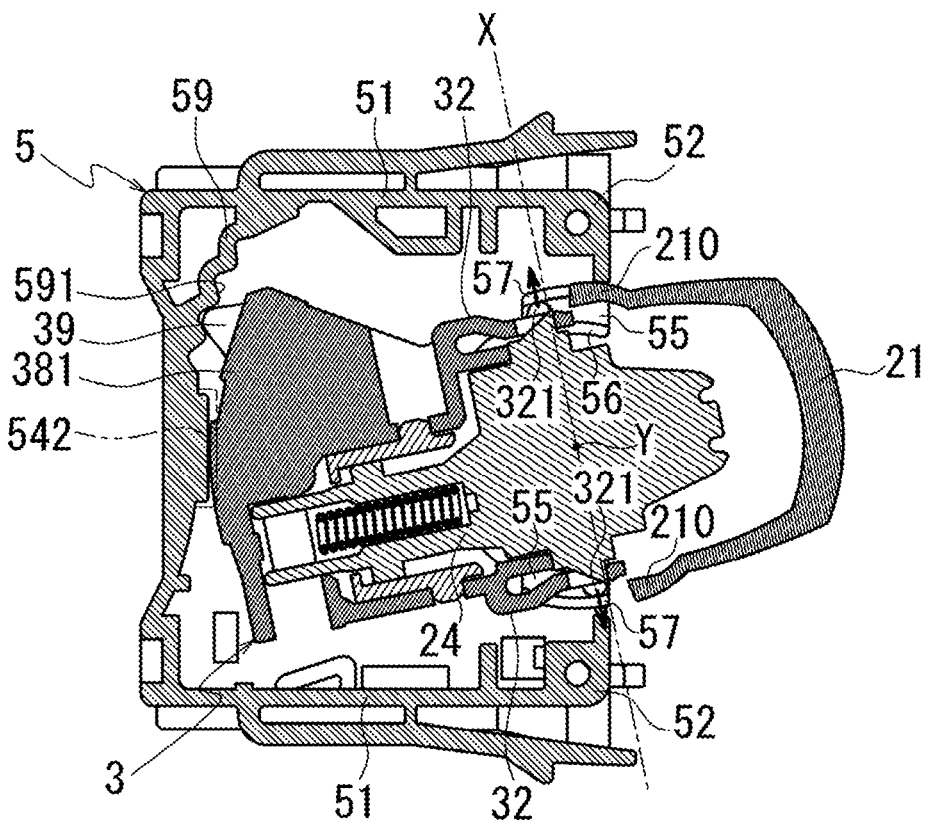
FIG. 11B is a cross sectional view explaining the operation of the lever device.

FIGS. 11A and 11B are drawings explaining a displacement of the movable component 3 upon operating the operable knob 2 in the lever device 1 and are cross sectional views taken along line D-D in FIG. 2.

In a state where the movable component 3 is assembled between the polar board 5 and the cover 6, the guide shafts 322, 323 extending from the movable component 3 to the cover 6-side are positioned within the guide groove 65 of the cover 6 (refer to FIG. 2 and FIG. 9A).

In addition, the guide shafts 321 extending from the movable component 3 to the polar board 5-side are positioned within the guide groove 55 of the polar board 5 and the shaft portion 34 extending from the movable component 3 to the polar board 5-side are positioned within the support hole 54a of the support tube 54 in the polar board 5 (refer to FIG. 1, FIG. 2, FIGS. 10A and 10B and FIGS. 11A and 11B).

As described before, the guide grooves 55, 65 are respectively provided along the virtual circle Imc surrounding the axis line Y by a predetermined interval. Therefore when the movable component 3 rotates around the axis line Y by an operation of the operable knob 2, the guide shaft 321 extending from the movable component 3 displaces in the circumferential direction around the axis line Y along the guide groove 55 (refer to FIG. 10B), and the guide shafts 322, 323 displace in the circumferential direction around the axis line Y along the guide groove 65 (refer to FIG. 9B).

Accordingly the movable component 3 is not inclined to the axis line Y even without providing the shaft portion on the axis line Y in the cover 6-side, to be rotatable around the axis line Y.

In addition, in the movable component 3, the posture holding portion 37 is provided in the outer diameter side of the guide shafts 323 on a basis of the axis line Y.

In the posture holding portion 37, the upper ends 371a of the abutting walls 371 are formed as flat faces perpendicular to the axis line Y, and abut on the sliding region 612 (refer to FIG. 3) of the cover 6 upon assembling the cover 6 to the polar board 5.

Accordingly when the movable component 3 rotates around the axis line Y, the movable component 3, while causing the upper ends 371a of the abutting walls 371 to slide on the sliding region of the cover 6, rotates around the axis line Y. Thereby since an inclination of the movable component 3 to the axis line Y is suppressed by the posture holding portion 37, the movable component 3 can be prevented from rotating around the axis line Y in a state of being inclined to the axis line Y.

Further, in the movable component 3, the sliding portion 38 formed in an arc shape as viewed in the direction of the axis line Y is positioned closer to the outer diameter side than the posture holding portion 37 on a basis of the axis line Y. The sliding face 381 of the sliding portion 38 in the cover 6-side abuts on the abutting face 582a of the engaging projection 582 in the polar board 5-side in the direction of the axis line Y upon assembling the cover 6 to the polar board 5.

The engaging projection 582 and the sliding face 381 are provided over a predetermined range in the circumferential direction around the axis line Y, and when the movable component 3 rotates around the axis line Y, the movable component 3 rotates while causing the sliding face 381 to slide on the abutting face 582a. Thereby the inclination of the movable component 3 to the axis line Y can be suppressed.

In addition, the movable component 3 rotates at the center of the shaft portion 34 positioned on the axis line Y in the polar board 5-side.

Here, the guide shafts 321 positioned in both sides of the shaft portion 34 as viewed in the direction of the axis line Y slide within the guide groove 55 when the movable component 3 rotates around the axis line Y.

As a result, even if a height h (refer to FIG. 7B) of the shaft portion 34 in the direction of the axis line Y is lower than in a case of the conventional lever device that is not provided with the guide shafts 321, it is possible to suppress the inclination of the movable component 3 to the axis line Y.

Accordingly a height (thickness) of the polar board 5 in the direction of the axis line Y can be made to be thinner corresponding to lowering the height of the shaft portion 34.

Further, the displacement of the support arm portions 32 in a direction of being away from each other in the direction of the axis line X is restricted by the guide shafts 321, 322 engaged to the guide groove 65 in the cover 6-side and the guide groove 55 in the polar board 5-side (refer to FIG. 2 and FIGS. 11A and 11B).

Therefore even if the operable knob 2 is forcibly operated in a direction of rotating the movable component 3 around the axis line Y, since the support arm portions 32 are not deformed in the direction of the axis line X, the operating portion 24 of the operable knob 2 is prevented from being separated and dropping from the movable component 3.

Accordingly it is not necessary to provide the restriction portion 102a for restricting the displacement of the support arm portion 106 in the protection portion 102 of the operable knob 101 as in a case of the lever device 100 according to the conventional example.

Therefore since it is not necessary to ensure the clearance for inserting the restriction portion 102a between the fixed component 110 and the movable component 104, it is possible to narrow the width of the lever device 1 in the direction of the axis line X by the amount corresponding to eliminating the clearance.

As described above, in the present embodiment, (1) the lever device 1 comprises:

the movable component 3 including the pair of support arm portions 32;

the operable knob 2 provided with the operating portion 24 in the base end side inserted between the pair of support arm portions 32, the operating portion 24 being supported by the pair of support arm portions 32 to be rotatable around the axis line X (first axis line); and the fixed component 4 configured to assemble the polar board 5 and the cover 6 in a direction of the axis line Y (second axis line) perpendicular to the axis line X, the movable component 3 being supported to be rotatable around the axis line Y in the fixed component 4, wherein the arc-shaped guide grooves 55, 65 to surround the axis line Y by a predetermined interval as viewed in the direction of the axis line Y are provided on opposing faces of each other of the polar board 5 and the cover 6, and the guide shaft 321 (projection) engaging to the guide groove 55 in the polar board 5-side and the guide shaft 322 (projection) engaging to the guide groove 65 in the cover 6-side are provided in the support arm portions 32.

With this configuration, when the operable knob 2 is operated in the direction of rotating the movable component 3 around the axis line Y, the movable component 3 rotates around the axis line Y while moving the guide shaft 321 engaged to the guide groove 55 in the polar board 5-side and the guide shaft 322 engaged to the guide groove 65 in the cover 6-side along the guide grooves 55, 65 respectively.

Thereby the rotation of the movable component 3 around the axis line Y is guided by the guide groove 65 in the cover 6-side and the guide groove 55 in the polar board 5-side, and the guide shafts 321, 322 engaged to the guide grooves 55, 65.

Figures 12A, 12B:
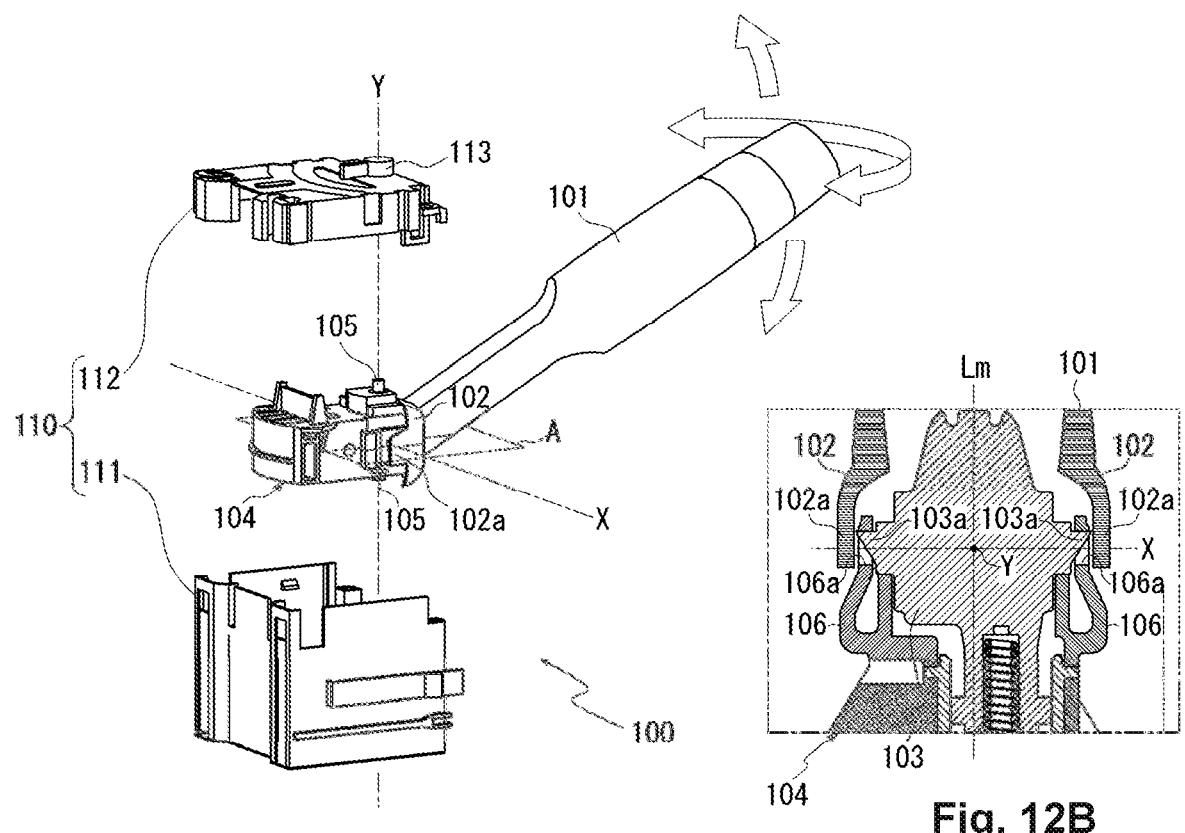
FIG. 12A is an exploded perspective view illustrating a lever device according to a conventional example.
FIG. 12B is a cross section view illustrating a part of the lever device in FIG. 12A.

As a result, even if the shaft-shaped projection (refer to the sign 105 in FIG. 12) provided to be concentric with the axis line Y is abolished for rotating the movable component 3 around the axis line Y, it is possible to rotate the movable component 3 around the axis line Y.

Thereby since it is not necessary to provide the support portion for rotatably supporting the shaft-shaped projection in a state of being thick in the direction of the axis line Y, it is possible to thin the thickness of the fixed component 4 in the direction of the axis line Y by an amount corresponding to no necessity for the support portion.

Further, the displacement of the support arm portions 32 in the direction of being away from each other in the direction of the axis line X is restricted by the guide shafts 321, 322 engaged to the guide groove 65 in the cover 6-side and the guide groove 55 in the polar board 5-side (refer to FIG. 2 and FIGS. 11A and 11B).

Therefore even if the operable knob 2 is forcibly operated in the direction of rotating the movable component 3 around the axis line Y, the operating portion 24 of the operable knob 2 is prevented from being separated and dropping from the movable component 3 due to the deformation of the support arm portions 32 in the direction of the axis line X.

Accordingly it is not necessary to provide the restriction portion (for example, the numeral 102a in FIG. 12) for restricting the displacement of the support arm portions 32 in the protection portion 210 of the operable knob 2, and it is not necessary to provide a wide clearance between the fixed component 4 and the movable component 3, for example, a wide clearance S between the boss portion 52 and the support arm portion 32 in a case of FIGS. 11A and 11B. As a result, it is possible to narrow the width of the lever device 1 in the direction of the axis line X by the amount corresponding to no necessity for the wide clearance S.

Therefore the lever device 1 can be miniaturized in the direction of the axis line X and in the direction of the axis line Y both.

(2) The guide groove 55 of the polar board 5 is formed between the pair of guide walls 56, 57 formed in an arc shape as viewed in the direction of the axis line Y, the guide groove 65 of the cover 6 is formed between the pair of guide walls 66, 67 formed in an arc shape as viewed in the direction of the axis line Y, and as viewed in the direction of the axis line Y, the guide grooves 55, 65 are provided along the virtual circle Imc at the center of the axis line Y.

With this configuration, since the guide shafts 321, 322, 323 of the movable component 3 are supported by the guide grooves 55, 65 formed between the polar board 5 and the cover 6 in the direction of the axis line Y, it is possible to support the movable component 3 by the fixed component 4 to be rotatable around the axis line Y without thickening the polar board 5 and the cover 6 in the direction of the axis line Y.

(3) The guide portion 36 (projecting portion) projecting to the cover 6-side is provided in the inside of the virtual circle Imc on the opposing portion of the movable component 3 to the cover 6, the guide portion 36 has the sliding face 361 (outer peripheral face) formed in an arc shape as viewed in the direction of the axis line Y on the outer periphery, and as viewed from the axis line Y, the sliding face 361 of the guide portion 36 is formed in an outer diameter matching an inner diameter of the guide wall 66 positioned in the axis line Y-side out of the pair of the guide walls 66, 67 in the cover 6-side, and the sliding face 361 is positioned on the virtual circle Im along the inner periphery of the guide wall 66.

With this configuration, when the movable component 3 rotates around the axis line Y, an inner periphery 661 of the guide wall 66 slides on the sliding face 361 of the outer periphery of the guide wall 66.

Thereby the movable component 3 can be prevented from being inclined to the axis line Y to rotate the movable component 3 around the axis line Y.

(4) The guide shafts 323 (projections) engaging to the guide groove 65 in the cover 6-side further including a plurality of guide shafts are provided on the upper wall portion 35 as the opposing portion in the movable component 3 to the cover 6, and as viewed in the direction of the axis line Y, the guide shaft 322 provided in the support arm portion 32 and the guide shaft 323 provided in the upper wall portion 35 are positioned on the virtual circle Imc in a positional relation of being symmetric about the virtual line Lm on one side (upper side in FIG. 8A) and the other side (lower side in FIG. 8B) of the virtual line Lm that is perpendicular to the axis line X and the axis line Y and is along an insert direction of the operating portion 24 of the operable knob 2.

Since the plurality of guide shafts 322, 323 are engaged to the guide groove 65 in the cover 6-side, it is possible to more smoothly perform the rotation of the movable component 3 around the axis line Y. In addition, since the guide shafts 322, 323 positioned on one side of the virtual line Lm and the guide shafts 322, 323 positioned on the other side are positioned to be symmetric about the virtual line Lm, the movable component 3 can be prevented from being inclined to the axis line Y when the movable component 3 rotates around the axis line Y.

(5) In the guide groove 65 in the cover 6-side as viewed in the direction of the axis line Y, one end 65a-side and the other end 65b-side in the circumferential direction around the virtual circle Imc are provided to bridge over the axis line X from one side in the direction of the virtual line Lm to the other side as an insert side of the operable knob 2, and when the guide shafts 322 provided in the support arm portions 32 are in a neutral position (refer to FIG. 9A) where the operable knob 2 is not operated, the guide shafts 322 are positioned to be closer to one side (opposite side to the operable knob 2) in the direction of the virtual line Lm than the axis line X as viewed in the direction of the axis line Y.

With this configuration, it is possible to rotate the movable component 3 in any direction of a clockwise direction and a counterclockwise direction around the axis line Y without dropping the guide shafts 322 from the guide groove 65.

(6) The support plate 33 (support portion) supporting the columnar shaft portion 34 (rotational shaft) projecting to the polar board 5-side is provided in the inside of the virtual circle Im on the opposing portion of the movable component 3 to the polar board 5, the shaft portion 34 is provided to be concentric with the axis line Y in the support plate 33, the support plate 33 has the sliding face 331 (outer peripheral face) formed in an arc shape as viewed in the direction of the axis line Y on the outer periphery, as viewed in the direction of the axis line Y, the sliding face 331 of the support plate 33 is formed in an outer diameter matching an inner diameter of the guide wall 56 positioned in the axis line Y-side out of the pair of the guide walls 56, 57 in the polar board 5-side, and the sliding face 331 is positioned on the virtual circle Im1 along the inner periphery of the guide wall 56.

With this configuration, when the movable component 3 rotates around the axis line Y, an inner periphery 561 of the guide wall 56 slides on the sliding face 331 of the outer periphery of the support plate 33.

Thereby the movable component 3 can be prevented from being inclined to the axis line Y to rotate the movable component 3 around the axis line Y.

(7) The guide groove 55 in the polar board 5-side as viewed in the direction of the axis line Y includes two guide grooves that are arranged in a positional relation to be symmetric about the virtual line Lm, each of the guide grooves 55 in the polar board 5-side is provided to bridge over the axis line X from the one side to the other side in the direction of the virtual line Lm, and is provided in the same angle range θ (FIG. 6) in the circumferential direction around the axis line Y, and the guide shafts 321 provided in the support arm portions 32 and engaged to the guide groove 55 in the polar board 5-side are positioned on the virtual circle Imc in a positional relation to be symmetric about the virtual line Lm in the one side (lower side in FIG. 7A) and the other side (upper side in FIG. 7A) of the virtual line Lm as viewed in the direction of the axis line Y.

With this configuration, when the movable component 3 rotates around the axis line Y, the movable component 3 can be prevented from being inclined to the axis line Y.

In addition, since the inclination of the movable component 3 is prevented by the guide shafts 321 engaged to the guide grooves 55, even if a height h (refer to FIG. 7B) of the shaft portion 34 in the direction of the axis line Y is lower than in a case of the conventional lever device 100 that is not provided with the guide shafts 321, it is possible to suppress the inclination of the movable component 3 to the axis line Y.

Accordingly a height (thickness) of the polar board 5 in the direction of the axis line Y can be made to be thinner corresponding to lowering the height of the shaft portion 34.

(8) As viewed in the direction of the axis line Y, in the support arm portion 32 positioned in one side of the virtual line Lm and in the support arm portion 32 positioned in the other side, the guide shaft 322 engaged to the guide groove 65 in the cover 6-side and the guide shaft 321 engaged to the guide groove 55 in the polar board 5-side are positioned on common axis lines Y1, Y2, and the axis line Y1 and the axis line Y2 are symmetric about the axis line Y and are in parallel with each other.

With this configuration, the movable component 3 can be prevented from being inclined to the axis line Y, while it is possible to rotate the movable component 3 around the axis line Y.

In addition, even if the operable knob 2 is forcibly operated in the direction of rotating the movable component 3 around the axis line Y, the support arm portion 32 positioned in one side of the virtual line Lm and the support arm portion 32 positioned in the other side are not twisted or deformed in the direction of the axis line Y. Therefore the operating portion 24 of the operable knob 2 does not separate or drop from the movable component 3.

Further, upon assembling the cover 6 to the polar board 5, the guide shafts 321 provided in the support arm portions 32 resiliently abut on the inner periphery of the guide wall 57 in the polar board 5-side, and the guide shafts 322 provided in the support arm portions 32 resiliently abut on the inner periphery of the guide wall 67 in the cover 6-side.

Particularly as viewed in the direction of the axis line Y, since the guide shafts 321, 322 are positioned in close proximity to the axis line X in the support arm portion 32 positioned in one side and in the support arm portion 32 positioned in the other side, chattering of the movable component 3 in the direction of the axis line X can be preferably prevented.

(9) In the support arm portions 32, the guide shaft 322 engaged to the guide groove 65 in the cover 6-side and the guide shaft 321 engaged to the guide groove 55 in the polar board 5-side are provided to be spaced in directions of the axis line Y1 and the axis line Y2 in parallel to the axis line Y, and in the support arm portions 32, support holes 320 of engaging shafts 241 provided in both sides of the operating portion 24 of the operable knob 2 are provided in a region between the guide shaft 322 engaged to the guide groove 65 in the cover 6-side and the guide shaft 321 engaged to the guide groove 55 in the polar board 5-side.

With this configuration, when the operable knob 2 is forcibly operated in the direction of rotating the movable component 3 around the axis line Y, the support arm portions 32 supporting the engaging shafts 241 in the operable knob 2-side are subjected to stress in the direction of causing the support arm portions 32 to be away from each other in the direction of the axis line X.

Here, in a case where the movement of the support arm portions 32 in the direction of causing the support arm portions 32 to be away from each other in the direction of the axis line X is not restricted, the operable knob 2 possibly drops from the movable component 3.

In the lever device 1 according to present embodiment, the displacement of the support arm portions 32 in the direction of the axis line X is restricted by the guide shafts 321, 322 and the guide grooves 55, 65 engaging to the guide shafts 321, 322. Therefore it is possible to preferably prevent occurrence of the above event.

In addition, in the conventional lever device 100, for preventing the occurrence of the above event, for example, it is necessary to add components or shapes for preventing deformation of the support wall of the engaging shaft (rotational shaft) in the operable knob side, but in the lever device 1 according to the present embodiment, it is not necessary to add the above components and shapes.

In the above-mentioned embodiment, there is exemplified a case where there are totally the four guide shafts in the cover 6-side and the two guide shafts in the polar board 5-side, but the number of the guide shafts is not limited to the total number of the present embodiment.

In addition, there is exemplified a case where the shaft portion 34 is provided in the polar board 5-side of the movable component 3, but the shaft portion 34 may be abolished to increase total number of the guide shafts projecting to the polar board 5-side.

DESCRIPTION OF REFERENCE NUMERALS

1 Lever device
2 Operable knob
21 Cover portion
210 Protection portion
22 Rotational knob
23 Shaft member 24 Operating portion (base end portion)
241 Engaging shaft
242, 243 Operating element
3 Movable component
30 Bottom wall portion
300 Insert hole
301, 302 Sliding element
31 Side wall
32 Support arm portion
320 Support hole
321, 322, 323 Guide shaft
33 Support plate (support portion)
331 Sliding face
332 Sliding element
333, 334 Stopper
34 Shaft portion (rotational shaft)
35 Upper wall portion
36 Guide portion (projecting portion)
361 Sliding face
362 Sliding element
37 Posture holding portion
371 Abutting wall
372 Reinforcement wall
38 Sliding portion
381 Sliding face
39 Engaging projection
4 Fixed component
5 Polar board
50 Partition wall portion
50a Side edge
501 Reinforcement rib
502 Insert hole
503 Reinforcement rib
504 Through hole
51 Side wall
52 Boss portion
52a Screw hole
521 Side face
521a Engaging projection
53 Rib
54 Support tube
54a Support hole
541 Engaging element
541a Engaging hole
55 Guide groove
56 Guide wall
561 Inner periphery
57 Guide wall
572 Outer periphery
58 Depth wall
582 Engaging projection
582a Abutting face
59 Click wall
591 Click groove
6 Cover
60 Ceiling plate portion
60a Side edge
61 Side wall
61a End portion
611 Reinforcement rib
612 Sliding region
613 Recessed groove
614 Engaging projection
62 Mounting portion
62a Screw portion
63 Engaging element
63a Engaging hole
64 Rib
65 Guide groove
66 Guide wall
661 Inner periphery
67 Guide wall
672 Outer periphery
100 Lever device
101 Operable knob
102 Protection portion
102a Restriction portion
103 Base end portion
103a Support shaft
104 Movable component
105 Shaft-shaped projection
106 Support arm portion
106a Support hole
110 Fixed component
111 Polar board
112 Cover
113 Support portion
Im1 to Im5 Virtual circle
Imc Virtual circle
Lm Virtual line (third axis line)
P Print board
X Axis line (first axis line)
Y Axis line (second axis line)
Y1, Y2 Axis line

What is claimed is:

1. A lever device comprising:
a movable component including a pair of support arm portions;
an operable knob provided with a base end portion inserted between the pair of support arm portions, the base end portion being supported by the pair of support arm portions to be rotatable around a first axis line; and
a fixed component configured to assemble a polar board and a cover in a direction of a second axis line perpendicular to the first axis line, the movable component being supported to be rotatable around the second axis line in the fixed component, wherein
arc-shaped guide grooves to surround the second axis line by a predetermined interval as viewed in the direction of the second axis line are provided respectively on opposing faces of each other of the polar board and the cover, and
projections engaging to the guide groove in a polar board side and the guide groove in a cover side are provided in the support arm portion.

2. The lever device according to claim 1, wherein:
the guide groove is formed between a pair of guide walls formed in an arc shape as viewed in the direction of the second axis line, and the guide groove is provided along a virtual circle at the center of the second axis line as viewed in the direction of the second axis line.

3. The lever device according to claim 2, wherein:
a projecting portion projecting to the cover side is provided in the inside of the virtual circle on an opposing portion of the movable component to the cover,
the projecting portion has an outer peripheral face formed in an arc shape as viewed in the direction of the second axis line, and
as viewed from the second axis line, the outer peripheral face of the projecting portion is formed in an outer diameter matching an inner diameter of the guide wall positioned in the second axis line side out of the pair of the guide walls in the cover side.

4. The lever device according to claim 3, wherein:
a projection engaging to the guide groove in the cover side is further provided on the opposing portion of the movable component to the cover, and
as viewed in the direction of the second axis line, the projection provided in the support arm portion and the projection provided in the opposing portion are positioned on the virtual circle in a positional relation of being symmetric about a third axis line on one side and the other side of the third axis line that is perpendicular to the second axis line and along an insert direction of the operable knob.

5. The lever device according to claim 4, wherein:
in the guide groove in the cover side as viewed in the direction of the second axis line, one end side and the other end side in a circumferential direction around the virtual circle are provided to bridge over the first axis line from one side in a direction of the third axis line to the other side as an insert side of the operable knob, and
when the operable knob is in a neutral position of being not operated, the projection provided in the support arm portion is positioned to be closer to one side in the direction of the third axis line than the first axis line as viewed in the direction of the second axis line.

6. The lever device according to claim 2, wherein:
a support portion supporting a columnar rotational shaft projecting to the polar board side is provided in the inside of the virtual circle on an opposing portion of the movable component to the polar board,
the rotational shaft is provided to be concentric with the second axis line in the support portion,
the support portion has an outer peripheral face formed in an arc shape as viewed in the direction of the second axis line, and
as viewed in the direction of the second axis line, the outer peripheral face of the support portion is formed in an outer diameter matching an inner diameter of the guide wall positioned in the second axis line side out of the pair of the guide walls in the polar board side.

7. The lever device according to claim 5, wherein:
a support portion supporting a columnar rotational shaft projecting to the polar board side is provided in the inside of the virtual circle on an opposing portion of the movable component to the polar board,
the rotational shaft is provided to be concentric with the second axis line in the support portion,
the support portion has an outer peripheral face formed in an arc shape as viewed in the direction of the second axis line, and
as viewed in the direction of the second axis line, the outer peripheral face of the support portion is formed in an outer diameter matching an inner diameter of the guide wall positioned in the second axis line side out of the pair of the guide walls in the polar board side.

8. The lever device according to claim 7, wherein:
the guide groove in the polar board side as viewed in the direction of the second axis line includes two guide grooves that are arranged in a positional relation to be symmetric about the third axis line,
each of the guide grooves in the polar board side is provided to bridge over the first axis line from the one side to the other side in the direction of the third axis line, and
the projection provided in the support arm portion and engaged to the guide groove in the polar board side is positioned on the virtual circle in a positional relation to be symmetric about the third axis line in the one side and the other side of the third axis line as viewed in the direction of the second axis line.

9. The lever device according to claim 8, wherein:
as viewed in the direction of the second axis line, in the support arm portions positioned in the one side and the other side of the third axis line, the projection engaged to the guide groove in the cover side and the projection engaged to the guide groove in the polar board side are provided coaxially.

10. The lever device according to claim 9, wherein:
in the support arm portion, the projection engaged to the guide groove in the cover side and the projection engaged to the guide groove in the polar board side are provided to be spaced in the direction of the second axis line, and
in the support arm portion, support holes of engaging shafts provided in both sides of the base end portion are provided in a region between the projection engaged to the guide groove in the cover side and the projection engaged to the guide groove in the polar board side.

11. A lever device comprising:
a movable component including a pair of support arm portions;
an operable knob provided with a base end portion inserted between the pair of support arm portions, the base end portion being supported by the pair of support arm portions to be rotatable around a first axis line; and
a fixed component configured to assemble a polar board and a cover in a direction of a second axis line perpendicular to the first axis line, the movable component being supported to be rotatable around the second axis line in the fixed component;
wherein arc-shaped guide grooves to surround the second axis line by a predetermined interval as viewed in the direction of the second axis line are provided respectively on opposing faces of each other of the polar board and the cover;
wherein projections engaging to the guide groove in a polar board side and the guide groove in a cover side are provided in the support arm portion;
wherein the guide groove is formed between a pair of guide walls formed in an arc shape as viewed in the direction of the second axis line, and the guide groove is provided along a virtual circle at the center of the second axis line as viewed in the direction of the second axis line;
wherein a projecting portion projecting to the cover side is provided in the inside of the virtual circle on an opposing portion of the movable component to the cover;
wherein the projecting portion has an outer peripheral face formed in an arc shape as viewed in the direction of the second axis line; and
wherein, as viewed from the second axis line, the outer peripheral face of the projecting portion is formed in an outer diameter matching an inner diameter of the guide wall positioned in the second axis line side out of the pair of the guide walls in the cover side.

12. A lever device comprising:
a movable component including a pair of support arm portions;
an operable knob provided with a base end portion inserted between the pair of support arm portions, the base end portion being supported by the pair of support arm portions to be rotatable around a first axis line; and
a fixed component configured to assemble a polar board and a cover in a direction of a second axis line perpendicular to the first axis line, the movable component being supported to be rotatable around the second axis line in the fixed component;

wherein arc-shaped guide grooves to surround the second axis line by a predetermined interval as viewed in the direction of the second axis line are provided respectively on opposing faces of each other of the polar board and the cover;

wherein projections engaging to the guide groove in a polar board side and the guide groove in a cover side are provided in the support arm portion;

wherein the guide groove is formed between a pair of guide walls formed in an arc shape as viewed in the direction of the second axis line, and the guide groove is provided along a virtual circle at the center of the second axis line as viewed in the direction of the second axis line;

wherein a support portion supporting a columnar rotational shaft projecting to the polar board side is provided in the inside of the virtual circle on an opposing portion of the movable component to the polar board;

wherein the rotational shaft is provided to be concentric with the second axis line in the support portion;

wherein the support portion has an outer peripheral face formed in an arc shape as viewed in the direction of the second axis line; and wherein, as viewed in the direction of the second axis line, the outer peripheral face of the support portion is formed in an outer diameter matching an inner diameter of the guide wall positioned in the second axis line side out of the pair of the guide walls in the polar board side.

* * * * *